United States Patent

Goodzeit et al.

[11] Patent Number: 5,806,804
[45] Date of Patent: Sep. 15, 1998

[54] ADAPTIVE HARMONIC DISTURBANCE COMPENSATION SYSTEM

[75] Inventors: Neil Evan Goodzeit, Princeton; Santosh Ratan, Highland Park, both of N.J.

[73] Assignee: Lockheed Martin Corp., East Windsor, N.J.

[21] Appl. No.: 748,037

[22] Filed: Nov. 12, 1996

[51] Int. Cl.$^6$ ............................. B64G 1/26; B64G 1/36
[52] U.S. Cl. ..................... 244/169; 244/171; 244/172; 244/173; 701/13
[58] Field of Search ............................. 244/158 R, 164, 244/169, 171, 172, 173; 701/13

[56] References Cited

U.S. PATENT DOCUMENTS

| | | | |
|---|---|---|---|
| 4,407,469 | 10/1983 | Fox | 244/169 |
| 4,537,375 | 8/1985 | Chan | 244/171 |
| 4,591,117 | 5/1986 | Scott | 244/170 |
| 4,684,084 | 8/1987 | Fuldner et al. | 244/173 X |
| 5,098,041 | 3/1992 | Uetrecht | 244/171 X |
| 5,687,933 | 11/1997 | Goodzeit et al. | 244/169 |

Primary Examiner—William Grant
Attorney, Agent, or Firm—W. H. Meise; W. M. Bielawski

[57] ABSTRACT

A spacecraft (10) carries a solar panel (17) which rotates to follow the sun, and also carries various thrusters (20). Thruster plume impingement on the solar panel affects the torque applied to the spacecraft body (12) in a manner which depends upon solar panel angle. The errors in the thrust during stationkeeping tend to perturb attitude, especially early in the maneuver, because of the delay inherent in the attitude control loop. A torque bias is summed with the residual torque demand signal to correct for the errors in torque. The torque bias signal is generated by a Fourier model of the torques, updated by an adaptive tuning filter, so that successive stationkeeping maneuvers progressively adapt the amplitude and phase of the Fourier coefficients in a manner which tends to minimize the residual torque demand and attitude error. Thus, the torque bias signal automatically approaches the correct value.

7 Claims, 4 Drawing Sheets

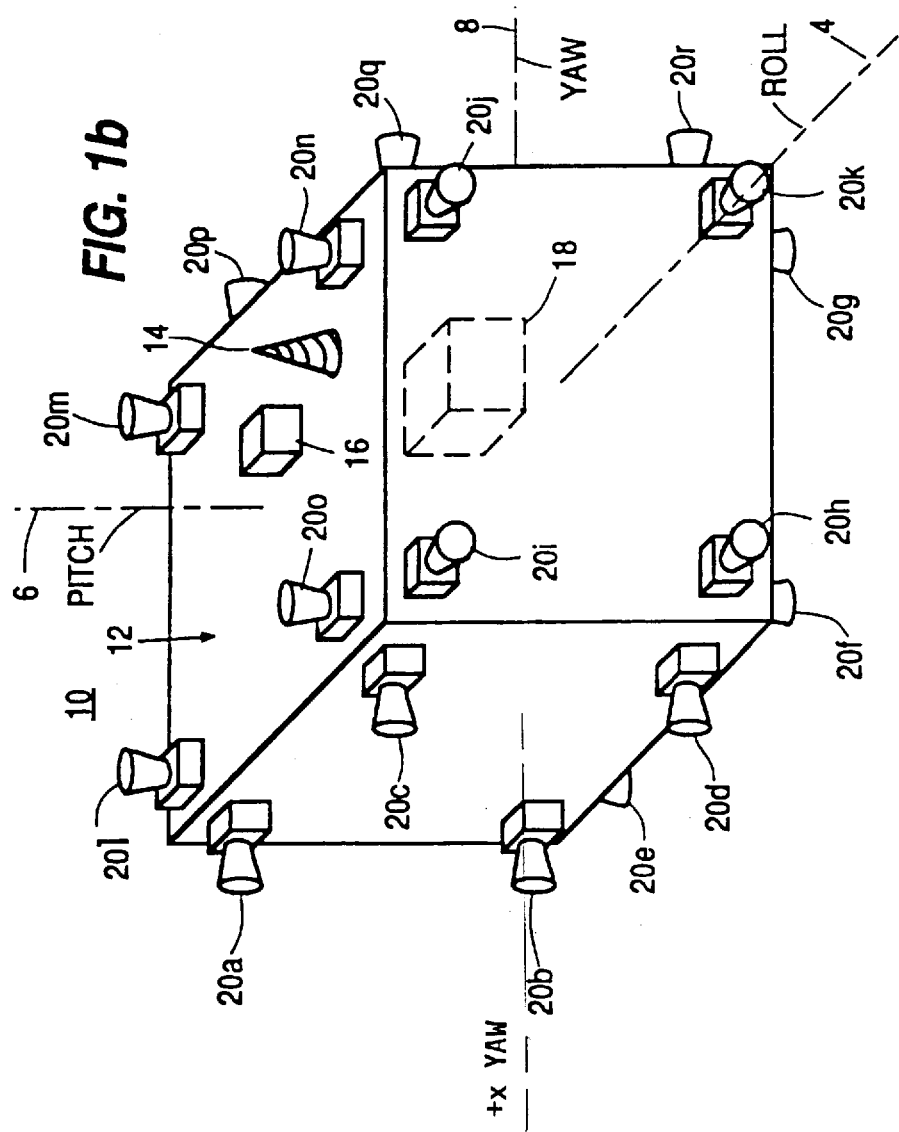

ADAPTIVE HARMONIC DISTURBANCE COMPENSATION SYSTEM

FIELD OF THE INVENTION

This invention relates to attitude control systems for spacecraft, and more particularly to arrangements for compensating for attitude effects attributable to plume impingement on movable appendages such as solar panels or antennas.

BACKGROUND OF THE INVENTION

FIG. 1a illustrates a geosynchronous spacecraft 10 including a body 12 in orbit about a heavenly body 2, which may be Earth. Spacecraft body 12 is associated with a system of orthogonal coordinates including a -x yaw axis 8 which extends between the spacecraft and the heavenly body 2, a roll or y axis 4, which lies along the orbital path, and a pitch or z axis 6. The spacecraft body 12 is three-axis stabilized relative to the x, y, and z axes, in order to maintain a payload (not illustrated), such as an antenna or a telescope, directed toward a specific target. As illustrated in FIG. 1a, spacecraft 10 includes an omnidirectional antenna 14 for communication of control and housekeeping information between a ground station 3 and the spacecraft, and also includes an extended appendage in the form of a solar panel 17. As illustrated in FIG. 1a, spacecraft body 12 carries a plurality of attitude control thrusters designated generally as 20, visible in more detail in FIG. 1b, in which each of the attitude control thrusters is designated with the general reference numeral 20, together with additional suffixes. As also illustrated in FIG. 1b, thrusters 20a, 20b, 20c, and 20d are located on the corners of the anti-Earth face. The South face (not visible) bears an additional four thrusters, including thrusters 20e, 20f, and 20g. The East face bears thrusters 20i, 20j, 20k, and 20h, and the North face bears thrusters 20l, 20m, 20n, and 20o. A receiver block 18 is coupled to antenna 14 to allow spacecraft 10 to receive communications from a ground station. An attitude sensor 16 is associated with the spacecraft to aid in determining its attitude about at least one of the x, y, and z axes.

FIG. 2 is a simplified block diagram of a prior-art attitude control system which may be used in conjunction with the arrangement of FIGS. 1a and 1b. In FIG. 2, attitude sensor 16 produces attitude-representative signals, and applies them to an input port of a differencing circuit or error signal generator 212. A source 214 of commanded signals, which may be autonomous or a store of memorized or uploaded information, applies the currently desired attitude to a second input port of error signal generator 212. Error signal generator 212 takes the difference between the commanded attitude and the actual attitude, and produces an attitude error signal, which is applied over a signal path 216 to a PID controller 218.

PID controller 218 of FIG. 2 includes a three-input-port summing circuit 220. A first input port of summing circuit 220 is coupled to receive a signal proportional to the error signal by way of a path 222, a second input port is coupled to receive an integrated version of the error signal by way of an integrator (∫) block 224, and a third input port is coupled to a block 226 to receive a differentiated (d/dt) version of the error signal, which is the error rate signal. Summing circuit 220 produces a proportional-integral-derivative (PID) residual torque demand signal $t_r$ at its output port 220o. The residual torque demand signal is applied over a signal path 229 to an input port of a further summing circuit 230, where the residual torque demand signal from signal path 229 is summed with a torque bias signal $t_b$ applied over a signal path 233. The torque bias signal $t_b$ is generated at a ground station and transmitted to the spacecraft by way of antenna 14 and receiver (RCVR) 18.

The sum of the residual torque signal $t_r$ and the torque bias signal $t_b$ applied to summing circuit 230 of FIG. 2 represents $t_d$, the total torque demand signal. The total torque demand signal $t_d$ is applied over a signal path 234 to a block 236, which represents logic for both thruster selection and for pulse width selection. Block 236 determines the combination of thrusters to be fired, and the various duty cycles to be used, based upon the locations of the thrusters, and the distances between their lines of action and the center of mass of the spacecraft. The signals from block 236 are applied to a block 238, which represents the drivers for the individual thrusters, which in the case of monopropellant thrusters may be simply drivers for electrically operated propellant valves, or pairs of valves for each bipropellant thruster, or it may include valve(s) and electrical arc or heater drive in the case of arcjets. When ion thrusters are used, the driver may control a valve for a mass ejection material together with control of the electrical drive. In operation of the arrangement of FIG. 2, the attitude control system operates essentially autonomously, comparing the actual attitude with the commanded attitude to generate the error signal. The error signal is processed by processor 218 to produce the residual torque demand signal $t_r$. The proportional, integral, and derivative components of the processing in block 218 are selected to provide stable response, and so that the overall loop bandwidth is low enough so that flexing of the spacecraft cannot couple through the attitude control system to produce instability or oscillations. Such flexing tends to be greater when the spacecraft includes long appendages, such as extensible solar panels or antenna array panels. The total torque demand signal $t_d$ is processed in block 236 to select the appropriate thrusters for maneuvers to provide thrust about the axis required to maintain the desired attitude, and to pulse those thrusters at a duty cycle which provides a torque which tends to maintain the attitude about the selected axis.

In certain rotational positions of solar panel 30 of FIG. 1a, the plumes of certain ones of the thrusters, when those thrusters are fired, may impinge on the panel. This plume impingement, as known, tends to perturb the torque applied to the body 12 by that thruster. This perturbation, in turn, causes the actual torque provided by the impinging thruster to differ both in magnitude and direction from that used by thruster and pulse-width selector block 236 of FIG. 2 as a basis on which to control the thrusters, and the difference depends upon the rotational position of the panel. As a result of this difference between the performance expected from the thrusters and their performance when their plumes impinge on the rotational appendage, the firing of the thrusters may result in unwanted second-order torque effects. It is desirable to compensate for the thrust differences attributable to plume impingement. The amount of unwanted torque due to thruster plume impingement on a panel varies with the rotational position of the panel. Put another way, there is a need to compensate for the second-order effects attributable to the impingement of the thruster plumes on the rotationally positionable solar panels.

In the arrangement of FIG. 2, compensation for the effects of plume impingement is provided by the torque bias signal applied over signal path 233 to summing circuit 230. This torque bias signal is uplinked from the ground by way of antenna 14 and receiver 18. The operators of the ground station generate the "unwanted torque" information, initially by calculation and estimation, and after the spacecraft has been in orbit for a period of time, from comparisons of the actual motion of the spacecraft produced by various torquing maneuvers with the motion which would have occurred from the known thrust magnitude and thrust direction of the thrusters in question. Thus, the torque bias information is generated by measuring the steady-state torque demand at each solar panel angle. This information, in turn, requires the keeping of a log of maneuvers, and of the position(s) of the panel(s) or other appendages during each maneuver, and further requires computations to extract the desired information from the data so stored.

Improved torque bias correction arrangements are desired.

SUMMARY OF THE INVENTION

A spacecraft according to the invention includes a body defining a center of mass, and at least one axis. At least one solar panel is mounted on the body and is rotationally movable relative to the body. An attitude sensor is coupled to the body for determining spacecraft attitude and attitude rate about the axis. The spacecraft attitude control system includes a source of commanded attitude about the axis. An error signal generator is coupled to the source of commanded attitude and to the attitude sensor, for generating error signals representative of the deviation of the spacecraft from the commanded attitude. A processor includes an output port, and also includes an input port coupled to the error signal generator, for processing the error signals in a manner including at least an integrating component, for generating torque demand signals at the output port of the processor. The torque demand signals are delayed by the controller structure, and in particular by the integration component of the processor operation. A plurality of thrusters are coupled to the body. Each of the thrusters is arranged for imparting a thrust along lines of force, which may not necessarily pass through the center of mass of the body, as a result of which energization of one of the plurality of thrusters tends to create a torque about the axis, and energization of selected ones of the thrusters may result in a change in velocity of the body together with unwanted residual torques about the axis. A thruster selection logic arrangement is coupled to the plurality of thrusters, for receiving torque drive signals, and for energizing selected ones of the plurality of thrusters in response to the torque drive signals. A velocity change thruster control arrangement is coupled to the plurality of thrusters, for energizing selected ones of the thrusters, for nominally imparting only a velocity to the body, but which undesirably tends to impart residual torques attributable to thruster plume impingement on the solar panel(s). These residual torques depend upon the position of the solar panel and on the particular thruster (s) which impinge thereon. A coupling arrangement is coupled to the output port of the processor and to the thruster selection logic arrangement, for receiving the torque demand signals, and for generating the thruster drive signals. The coupling arrangement closes a degenerative feedback or control loop which responds to the existence of attitude errors, and tends to operate the thrusters in a manner which reduces the deviation of the body attitude from the commanded attitude. Operation by the velocity change thruster control arrangement of the selected ones of the thrusters tends to immediately generate the residual torques, which tend to be compensated by the degenerative feedback loop, but with a delay occasioned by processing. The delay allows the attitude of the body of the spacecraft to deviate from the commanded attitude about the axis. The coupling arrangement further includes (a) a summer or summing circuit including a torque bias signal input port, and also including a second input port coupled to the output port of the processor, for summing the torque bias signals applied to the torque bias signal input port with the torque demand signals, for generating the torque drive signals. The coupler also includes a torque bias signal generator coupled to the processor and to the torque bias input port of the coupling arrangement. The torque bias signal generator includes a torque bias modeling arrangement coupled to the output port of the processor, for receiving the torque demand signals, and for generating the torque bias signals. The torque bias modeling arrangement of the torque bias signal generator includes a Fourier series processor for generating, in response to solar array angle, signals representing the amplitudes and phases of components of a Fourier series representing the torque bias signal.

BRIEF DESCRIPTION OF THE DRAWINGS

FIG. 1b illustrates details of the body of the spacecraft;

FIG. 2 is a simplified block diagram of a prior art attitude control system which may be used to control the attitude of the spacecraft of FIG. 1a;

DESCRIPTION OF THE INVENTION

Figure 1A:
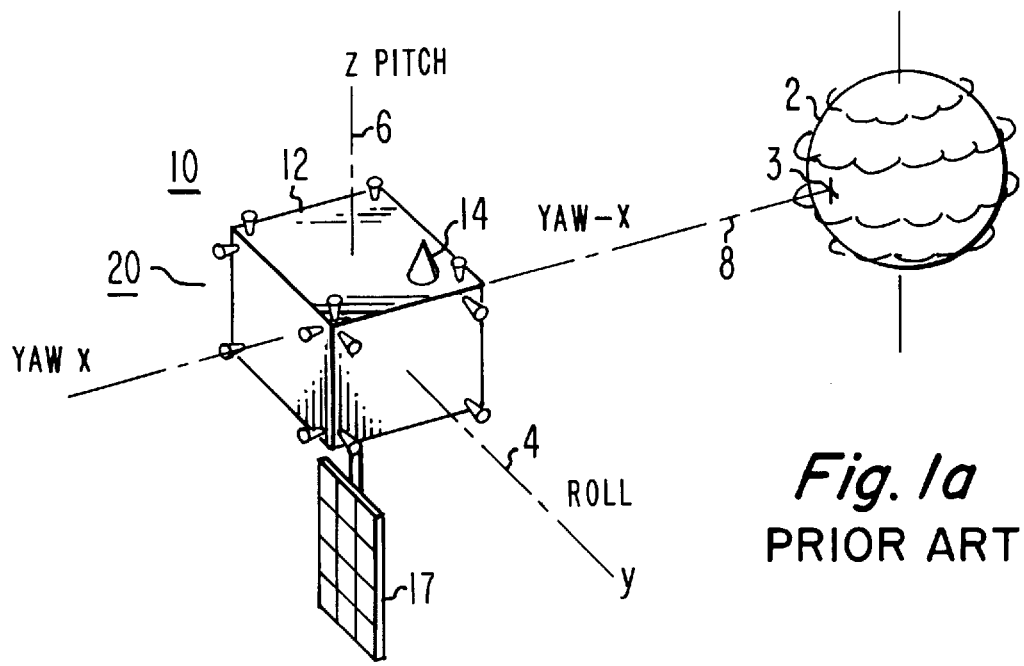
FIG. 1a illustrates a geosynchronous spacecraft in orbit about a heavenly body.
Figure 2:
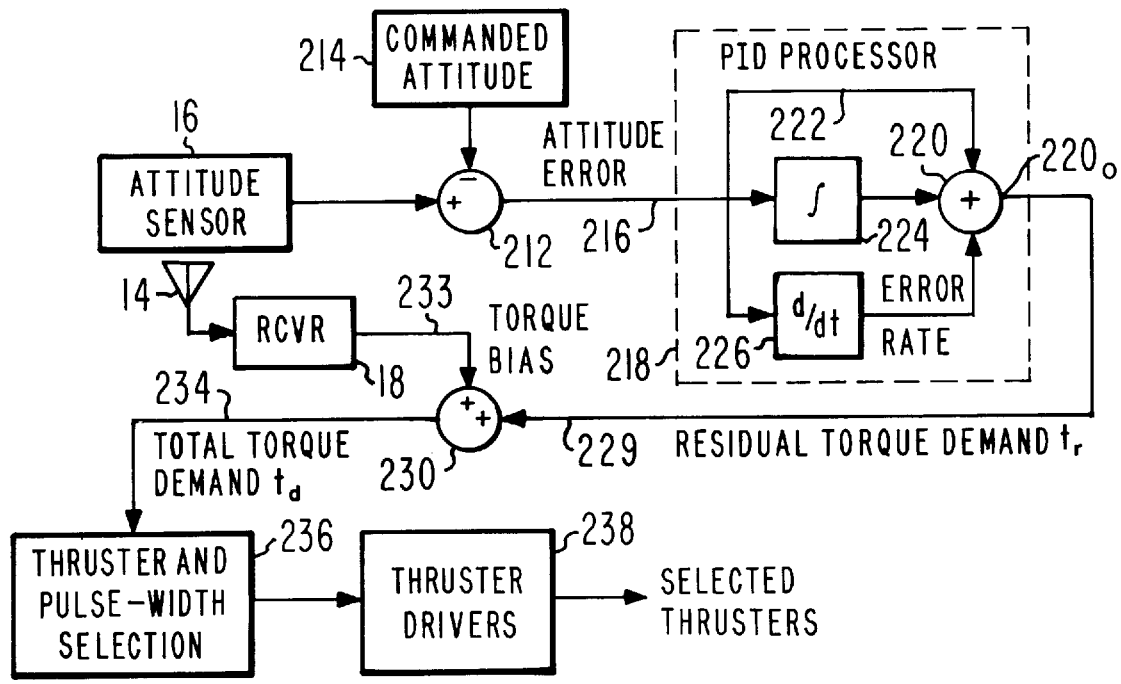
Figure 3:
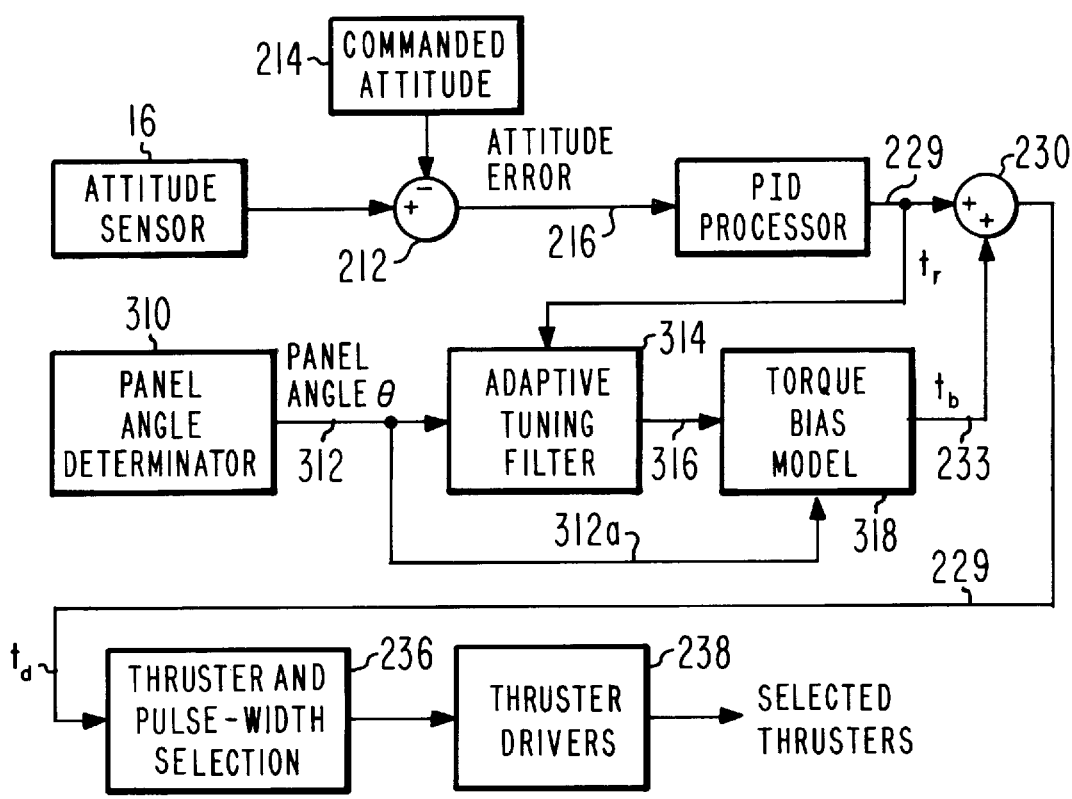
FIG. 3 is a simplified block diagram of an attitude control system in accordance with an aspect of the invention.

FIG. 3 is similar to FIG. 2, and corresponding elements are designated by like reference numerals. The arrangement of FIG. 3 differs from that of FIG. 2 in the way in which the torque bias $t_b$ is generated ($t_b$ and $T_b$ are used interchangeably herein). Once the torque bias $t_b$ is generated, it is applied to summing circuit 230 just as in the arrangement of FIG. 2, for combination with the residual torque demand $t_r$ applied over signal path 229 ($t_r$ and $T_r$ are used interchangeably herein), to generate the total torque demand $t_d$.

In FIG. 3, the torque bias signal is not required to be generated at a ground station, but is instead generated by equipment which may be located on-board the spacecraft, as illustrated. In general, the arrangement of blocks 310, 312, and 318 generates a signal which is an approximation of the torque bias $t_b$, in which the approximation signal is in the form of a truncated Fourier series.

In FIG. 3, a panel rotational angle determination device is illustrated as a block 310. Block 310 may be an angle resolving device which actually measures the rotational position of the panel, or it may be software which determines the panel angle from time of day, orbital position, or the like. However generated, the panel angle signal θ is applied from block 310 over a signal path 312 to an adaptive tuning filter illustrated as a block 314, and over an extension 312a of signal path 312 to a torque bias model illustrated as a block 318. Block 314 also receives the current value of the residual torque demand signal $t_r$ from PID processor 218 by way of signal path 229. Adaptive tuning filter 314 processes the $t_r$ and θ signals to generate signals representative of the amplitudes and phases of Fourier coefficients, as described below. The current values of the Fourier coefficients are coupled from adaptive tuning filter 314 by way of a signal path 316 to torque bias model 318. The torque bias model receives the Fourier coefficients from the adaptive tuning filter, and the panel angle signal θ from block 310, to produce a representation $t_b$ of the bias torque. The bias torque is applied over a signal path 233 to summing circuit 230.

The torque bias $t_b$ appropriate for application to summing circuit 230 may be modeled or approximated in block 318 by $$T_b = A_0 + \sum_{i=1,N} A_i \sin(i\theta + \phi_i)$$

where:
N is the number of harmonic terms in the Fourier series, which is a predetermined number;
$A_0$ represents a constant torque bias, representing the average bias torque over all solar array angles;
$A_i$ are the harmonic amplitudes of the N terms;
$\Phi_i$ are the harmonic phases; and
$\Theta$ is the panel angle.

The initial values of the Fourier coefficients are initially assigned or preset based upon estimates of the torque bias for each thruster pair, since thrusters are fired in pairs for North-South stationkeeping.

Since the initial values are only approximations, the actual torque bias during a stationkeeping maneuver will differ from the estimated value due to uncertainties attributable to plume torques, series truncation, and uncertainties in the actual thruster locations, lines of action, and thrust magnitude, and also due to uncertainties in the location of the center of mass of the spacecraft. The errors in the approximation are progressively reduced during operation of the spacecraft by the adaptive tuning filter 314 of FIG. 3, which updates the model parameters or Fourier coefficients as the various stationkeeping maneuvers take place.

The adaptive filter 314 of FIG. 3 updates the constant torque bias $A_0$ in accordance with $$A_0 = A_0 + K_0 T_r \quad (2)$$

where $K_0$ is the constant torque bias update gain. Similarly, the adaptive filter updates the amplitude coefficients as $$A_i = A_i + 2K_{\alpha_i} \sin(i\Theta + \Phi_i) T_r \quad (3)$$

where $K_{\alpha_i}$ are the amplitude update gains. The harmonic phases are updated as $$\phi_i = \phi_i + 2 \frac{K_{\phi i}}{A_{initi}} \cos(i\theta + \phi_i) T_r \quad (4)$$

where:
$K_{\theta i}$ are the phase update gains, and
$A_{initi}$ are the initial values of the harmonic amplitudes.

In operation of the arrangement of FIG. 3, stationkeeping maneuvers take place in the ordinary course of spacecraft operation, the tuning filter does not respond to the initial transient, or if it does, it can be locked out during the transient. As the stationkeeping maneuver progresses, the model represented by block 318 produces a current value of bias torque $t_b$. If the approximation is very good, the residual torque t, will be small during the maneuver. The adaptive tuning filter 314 of FIG. 3 calculates constant torque bias $A_0$ according to equation (2), with the result that the value of $A_0$ remains essentially unchanged because the residual torque $t_r$ is small. Adaptive filter 314 also calculates the updated values of the Fourier amplitudes in accordance with equation (3), with the result that the product of the right-hand term essentially vanishes, because $T_r$ is very small, whereupon $A_i$ remains unchanged. Similarly, adaptive filter 314 also calculates the updated phase values $\theta_i$ according to equation (4). Since $T_r$ is very small, $\theta_i$ remains unchanged. The adaptive filter bandwidth is low, so the bias torque portion of the control loop makes a relatively small correction, which is based on the residual torque demand during the maneuver.

Figure 4:
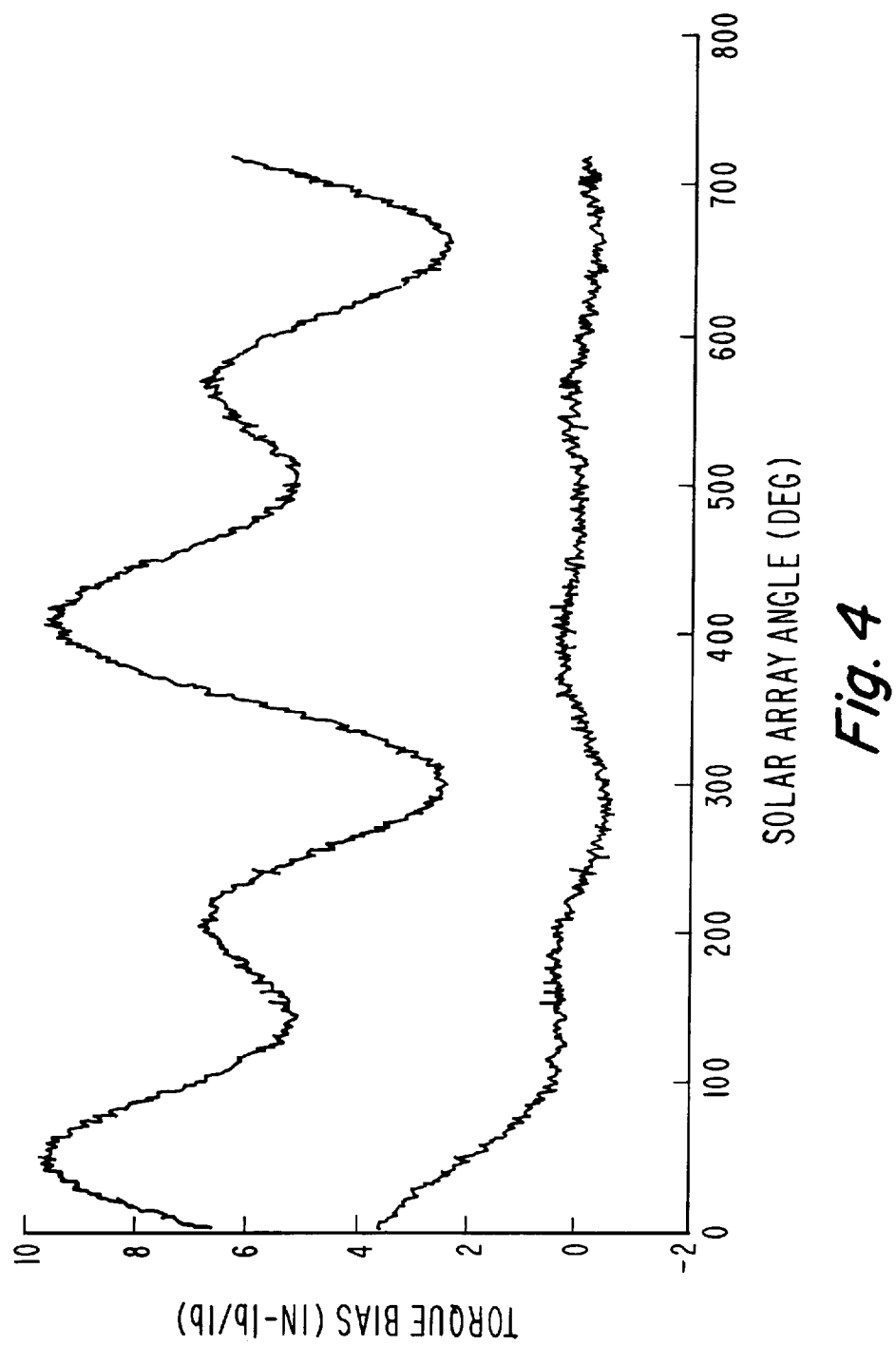
FIG. 4 includes plots of total torque demand and the residual torque demand versus solar array angle for a system according to the invention.

FIG. 4 illustrates plots of the total torque demand and the residual torque demand for a system according to the invention over a period of two years, corresponding, in this case, to 720° of solar panel rotation (360° per year). As illustrated, the upper plot represents the total torque demand, while the lower plot represents the residual torque demand. As a result of using the processor and method according to the invention, the value of residual torque drops monotonically from 0° to about 90°, and thereafter remains essentially constant about zero torque.

Thus, the described arrangement selects the torque bias over time in a manner which tends to minimize the residual torque. This correction is generated essentially autonomously, without requiring logging and calculations on the part of the ground station (except, of course, for the estimation of the initial value of the torque bias). The update gains are pre-specified.

A spacecraft (10) according to the invention, then, includes a body (12) defining a center of mass, and at least one control axis (x, y, or z). The body (12) bears at least one solar panel (17) or other appendage which is rotationally movable relative to the body (12). An attitude sensor arrangement (16) is coupled to the body for determining spacecraft attitude and attitude rate about the control axis (or axes). The spacecraft includes some sort of source (214) of commanded attitude relative to the control axis. An error signal generator (212) is coupled to the source (214) of commanded attitude and to the attitude sensor arrangement (16), for generating error signals representative of the deviation of the spacecraft from the commanded attitude. A processor arrangement (218) includes an output port, and also includes an input port coupled to the error signal generator (212), for processing the error signals in a manner including at least an integrating component, for thereby generating torque demand ($t_r$) signals at the output port of the processor arrangement (218). A plurality of thrusters (20) are coupled to the body. Each of the thrusters (20) is arranged for imparting a thrust along lines of force which may not pass through the center of mass of the body, as a result of which energization of one of the thrusters tends to create a torque about the control axis, and energization of selected ones of the plurality of the thrusters may result in a change in velocity of the body, together with unwanted residual torques about the control axis. Thruster selection logic (236) is coupled to the plurality of thrusters (20), for receiving torque drive ($t_d$) signals, and for energizing selected ones of the plurality of thrusters in response to the torque drive ($t_d$) signals. A velocity change thruster controller (238) is coupled to the plurality of thrusters (20), for energizing selected ones of the thrusters, for nominally imparting only a velocity to the body, but which undesirably tends to impart residual torques attributable to thruster plume impingement on the solar panel (17). A coupling arrangement (230, 310, 312, 314, 318) is coupled to the output port of the processor arrangement (218) and to the thruster selection logic (236), for receiving the torque demand signals ($t_r$), and for generating the thruster drive signals ($t_d$). The coupling arrangement (230, 310, 312, 314, 318) closes a degenerative feedback loop (16, 212, 216, 229, 230, 236, 238, 20) which tends to operate the thrusters (20) in a manner which reduces the deviation of the attitude from the commanded attitude. As a result of the operation of the velocity change thruster controller (238), selected ones of the thrusters are fired, which tends to immediately generate residual torques, which tend to be compensated by the degenerative feedback loop. However, processing delay allows the attitude of the body (12) of the spacecraft (10) to deviate from the commanded attitude about the control axis. The coupling arrangement (230, 310, 312, 314, 318) further includes (a) a summing arrangement (230) including a torque bias ($t_b$) signal input port, and a further input port coupled to the output port of the processor arrangement (218), for summing torque bias ($t_b$) signals applied to the torque bias signal input port of the summing arrangement (230) with the torque demand ($t_r$) signals, for thereby generating the torque drive ($t_d$) signals, and (b) a torque bias signal generator (310, 312, 314, 318) coupled to the output port of the processor arrangement (218) and to the torque bias input port of the a summing arrangement (230). The torque bias signal generator (310, 312, 314, 318) includes a torque bias model (314, 318) coupled to the output port of the processor arrangement (218) for receiving the torque demand ($t_r$) signals, and for, in response to solar array rotational angle ($\theta$), generating signals representing the amplitude and phase of Fourier components representing the torque bias signals.

In a particular embodiment of the invention, the torque bias signal generator (310, 312, 314, 318) includes a Fourier coefficient updating arrangement (314) coupled to the torque bias model (314, 318), for establishing a predetermined value of constant torque bias $A_0$ as the sum of the previous value of $A_0$ added to a product, where the product is the product of a constant multiplied by the torque demand signal.

In another embodiment of the invention, the spacecraft (10) torque bias signal generator (310, 312, 314, 318) includes a Fourier coefficient updating arrangement (314), for establishing the predetermined value of the amplitudes of the harmonic terms $A_i$ as the sum of the previous value of $A_i$ added to a product, where the product is the product of the value of the torque demand signal multiplied by a sinusoidal function of the sum of two angles, and wherein the two angles are the angle of the solar panel and the angle of the harmonic terms.

Other embodiments of the invention will be apparent to those skilled in the art. For example, the adaptive filter and the torque model may be embodied in, or performed by, digital processors. While a single axis of control has been described, the principles may be applied to two or more control axes. The loop bandwidth of the control system has been described as limited so that the flexing of the spacecraft cannot couple through the attitude control system to produce instability; this bandwidth limitation may be accomplished with a discrete low-pass filter, or by appropriate selection of component values, or of software constants in a processor-controlled system.

What is claimed is:

1. A spacecraft, comprising:

a body defining a center of mass, and at least one axis:

at least one solar panel rotationally movable relative to said body;

attitude sensing means coupled to said body for determining spacecraft attitude and attitude rate about said axis;

a source of commanded attitude about said axis;

error signal generating means coupled to said source of commanded attitude and to said attitude sensing means, for generating error signals representative of the deviation of said spacecraft attitude from said commanded attitude;

processing means including an output port, and also including an input port coupled to said error signal generating means, for processing said error signals in a manner including at least an integrating component, for generating torque demand signals at said output port of said processing means;

a plurality of thruster means coupled to said body, at least one of said thruster means being arranged for imparting a thrust along lines of force which do not pass through said center of mass of said body, whereby energization of said at least one of said plurality of thruster means tends to create a torque about said axis, and energization of selected ones of said plurality of said thruster means results in a change in velocity of said body together with unwanted residual torques about said axis;

thruster selection logic means coupled to said plurality of thruster means, for receiving thruster drive signals, and for energizing selected ones of said plurality of thruster means in response to said thruster drive signals;

velocity change thruster control means coupled to said plurality of thruster means, for energizing selected ones of said thruster means, for nominally imparting only a velocity to said body, but which undesirably tends to impart residual torques attributable to thruster plume impingement on said at least one solar panel;

coupling means coupled to said output port of said processing means and to said thruster selection logic means, for receiving said torque demand signals, and for generating said thruster drive signals, said coupling means closing a degenerative feedback loop which tends to operate said thruster means in a manner which reduces said deviation of said attitude from said commanded attitude, whereby operation by said velocity change thruster control means of said selected ones of said thruster means tends to immediately generate said residual torques, which tend to be compensated by said degenerative feedback loop, but with a delay which allows said attitude of said body of said spacecraft to deviate from said commanded attitude about said axis, said coupling means further comprising (a) summing means including a torque bias signal input port and an input port coupled to said output port of said processing means, for summing torque bias signals applied to said torque bias signal input port with said torque demand signals, for thereby generating said thruster drive signals, and (b) torque bias signal generating means coupled to said output port of said processing means and to said torque bias input port of said summing means, said torque bias signal generating means comprising torque bias modeling means coupled to said output port of said processing means for receiving said torque demand signals, and for, in response to solar panel rotational angle, generating signals representing the amplitude and phase of Fourier components representing said torque bias signals.

2. A spacecraft according to claim 1, further comprising Fourier coefficient updating means coupled to said torque bias signal generating means, for establishing a predetermined value of constant torque bias $A_0$ as the sum of the previous value of $A_0$ added to a product, where said product is the product of a constant multiplied by said torque demand signal.

3. A spacecraft according to claim 1, further comprising Fourier coefficient updating means coupled to said torque bias signal generating means, for establishing a predetermined value of the amplitude of harmonic terms $A_i$ as the sum of the previous value of $A_i$ added to a product, where said product is the product of the value of said torque demand signal multiplied by a sinusoidal function of the sum of two angles, wherein said two angles are said angle of said solar panel and the angle of said harmonic terms.

4. A spacecraft according to claim 1, wherein said processing means produces a proportional-integral-derivative signal.

5. A spacecraft, comprising:

a body defining a center of mass, and at least one axis:

a rotational appendage carried by said body;

angle sensing means coupled to said rotational appendage, for generating rotational position signals indicative of the rotational position of said appendage;

attitude sensing means coupled to said body for determining spacecraft attitude about said axis;

a source of commanded attitude about said axis;

error signal generating means coupled to said source of commanded attitude and to said attitude sensing means, for generating error signals representative of the deviation of said spacecraft attitude from said commanded attitude;

PID processing means providing a proportional-integral-derivative signal, and including an input port coupled to said error signal generating means, and also including an output port, for processing said error signals for generating torque demand signals at said output port;

a plurality of thruster means coupled to said body, at least one of which is arranged for Imparting a thrust along lines of force which does not pass through said center of mass of said body, whereby energization of said at least one of said plurality of thruster means tends to create a torque about said axis, energization of selected ones of said plurality of said thruster means resulting in a change in velocity of said body, and impingement of the plumes of said thruster means on said rotational appendage resulting in unwanted residual torques about said axis;

thruster selection logic and control means coupled to said plurality of thruster means, for receiving torque drive signals, and for energizing said selected ones of said plurality of thruster means in response to said torque drive signals, for nominally imparting only a velocity to said body, but which undesirably tends to impart residual torques attributable to said rotational appendage;

coupling means coupled to said PID processing means and to said thruster selection logic means, for receiving said torque demand signals, and for generating said thruster drive signals, which closes a degenerative feedback loop which tends to operate said thruster means in a manner which reduces said attitude error, whereby operation by said velocity change thruster control means of said selected ones of said thrusters tends to immediately generate said residual torques, which tend to be compensated by said degenerative feedback loop, but with a delay which allows said attitude of said body of said spacecraft to deviate from said commanded attitude about said axis, said coupling means further comprising a torque bias signal input port, and summing means coupled to said torque bias signal input port and to said PID processing means, for summing said torque bias signals applied to said torque bias signal input port with said torque demand signals for generating said torque drive signals; and torque bias signal generating means coupled to said PID processing means and to said torque bias input port of said coupling means, said torque bias signal generating means, comprising torque bias modeling means coupled to said output port of said PID processing means, for receiving said torque demand signals and said rotational position signals, for generating said torque bias signals therefrom, said torque bias model comprising Fourier series processing means for determining said torque bias signal in response to said rotational appendage angle, for predetermined values of constants including constant torque bias, and the amplitudes and phases of harmonic terms.

6. A method for operating a spacecraft which is stabilized about at least one control axis, and which includes thrusters, and a rotational appendage which, in at least some rotational positions, lies within the plume of a thruster, said method comprising the steps of:

commanding an attitude of said spacecraft about said at least one control axis, to generate commanded-attitude signals;

sensing the attitude of said spacecraft about said at least one control axis, to generate attitude-representative signals;

taking the difference between said commanded-attitude signals and said attitude-representative signals, to thereby generate attitude error signals;

processing said error signals with a transfer function which includes at least an integral function, to thereby produce processed signals $T_r$;

generating angle signals representing the rotational position $\theta$ of said rotational appendage;

determining Fourier amplitude and angle coefficient signals from said angle signals and said processed signals;

generating torque bias signals from said angle signals and said processed signals;

summing said torque bias signals with said processed signals, to thereby produce torque drive signals;

controlling said thrusters in response to said torque drive signals.

7. A method according to claim 6, wherein said step of determining Fourier amplitude and angle information includes the steps of performing processing corresponding to (a) updating the constant torque bias $A_0$ in accordance with $$A_0 = A_0 + K_0 T_r \qquad (5)$$

where $K_0$ is the constant torque bias update gain;

(b) updating the amplitude coefficients as $$A_i = A_i + 2K_{\alpha_i} \sin(i\Theta + \Phi_i) T_r \qquad (6)$$

where $K\alpha_i$ are the amplitude update gains; and (c) updating the harmonic phases $\Phi_i$ as $$\phi_i = \phi_i + 2 \frac{K_{\phi i}}{A_{initi}} \cos(i\theta + \phi_i) T_r \qquad (7)$$

where:

$K_{\theta i}$ are the phase update gains, and $A_{initi}$ are the initial values of the harmonic amplitudes.

* * * * *